(12) United States Patent
Kleinschmidt

(10) Patent No.: US 6,801,561 B2
(45) Date of Patent: Oct. 5, 2004

(54) LASER SYSTEM AND METHOD FOR SPECTRAL NARROWING THROUGH WAVEFRONT CORRECTION

(75) Inventor: Juergen Kleinschmidt, Weissentels (DE)

(73) Assignee: Lambda Physik AG, Goettingen (DE)

(*) Notice: Subject to any disclaimer, the term of this patent is extended or adjusted under 35 U.S.C. 154(b) by 166 days.

(21) Appl. No.: 09/960,875

(22) Filed: Sep. 21, 2001

(65) Prior Publication Data
US 2002/0057723 A1 May 16, 2002

Related U.S. Application Data
(60) Provisional application No. 60/235,116, filed on Sep. 25, 2000.

(51) Int. Cl.[7] .............................................. H01S 3/223
(52) U.S. Cl. .......................................... 372/57; 372/55
(58) Field of Search ...................... 372/55, 57, 98–101

(56) References Cited

U.S. PATENT DOCUMENTS

| | | | |
|---|---|---|---|
| 3,582,190 A | * 6/1971 | Smith ........................... | 372/99 |
| 3,899,750 A | 8/1975 | Hochuli ....................... | 331/94.5 |
| 4,156,209 A | 5/1979 | Herbst et al. ............... | 331/94.5 |
| 4,360,925 A | 11/1982 | Brosnan et al. ............... | 372/95 |
| 4,393,505 A | 7/1983 | Fahlen ......................... | 372/57 |
| 4,399,540 A | 8/1983 | Bucher ......................... | 372/20 |
| 4,429,392 A | 1/1984 | Yoshida et al. ................ | 372/9 |
| 4,477,909 A | 10/1984 | Salvi et al. .................... | 372/95 |
| 4,534,034 A | 8/1985 | Hohla et al. ................... | 372/59 |
| 4,611,270 A | 9/1986 | Klauminzer et al. ........ | 364/183 |
| 4,616,908 A | 10/1986 | King ............................. | 350/576 |
| 4,664,488 A | 5/1987 | Sawicki et al. ............. | 350/611 |
| 4,691,322 A | 9/1987 | Nozue et al. ................. | 372/82 |
| 4,696,012 A | 9/1987 | Harshaw ....................... | 372/99 |
| 4,740,982 A | 4/1988 | Hakuta et al. ................ | 372/59 |

(List continued on next page.)

FOREIGN PATENT DOCUMENTS

| | | | |
|---|---|---|---|
| DE | 298 22 082 | 3/1999 | ............. H01S/3/08 |
| DE | 298 22 090 | 3/1999 | ............. H01S/3/08 |
| EP | 0 472 727 A1 | 3/1992 | ......... H01S/3/1055 |
| JP | 5-152666 | 6/1993 | |
| WO | WO 96/16455 | 5/1996 | ............. H01S/3/08 |

OTHER PUBLICATIONS

H.H. Barrett, et al., "Retroreflective Arrays as Approximate Phase Conjugators," *Optics Letters*, vol. 4, No. 6, Jun. 1979, pp. 190–192.

(List continued on next page.)

*Primary Examiner*—Don Wong
*Assistant Examiner*—James Menefee
(74) *Attorney, Agent, or Firm*—Stallman & Pollock LLP

(57) ABSTRACT

An excimer or molecular fluorine laser system a wavefront compensating optic within its resonator for adjusting the curvature of the wavefront of the beam for compensating wavefront distortions and thereby enhancing the spectral purity of the beam. The wavefront compensating optic may be a plate, such as a null lens. One or both surfaces of the null lens may be adjustable and/or have an adjustable curvature for controlling the wavefront distortion compensation. A multi-compartment enclosure may be included having at least one optical component of the line-narrowing unit within each compartment. An atmosphere within at least one compartment is preferably controlled for controlling the spectral purity of the beam by controlling an amount of wavefront distortion compensation. The wavefront compensating optic may be sealably disposed between adjacent compartments.

30 Claims, 3 Drawing Sheets

U.S. PATENT DOCUMENTS

| | | |
|---|---|---|
| 4,829,536 A | 5/1989 | Kajiyama et al. ............. 372/57 |
| 4,853,528 A | 8/1989 | Byren et al. ............ 250/203 R |
| 4,856,018 A | 8/1989 | Nozue et al. .................. 372/98 |
| 4,860,300 A | 8/1989 | Baumler et al. ............... 372/57 |
| 4,873,692 A | 10/1989 | Johnson et al. ............... 372/20 |
| 4,905,243 A | 2/1990 | Lokai et al. ................... 372/32 |
| 4,906,087 A | 3/1990 | Ealey et al. ................. 359/611 |
| 4,918,704 A | 4/1990 | Caprara et al. ............... 372/99 |
| 4,926,428 A | 5/1990 | Kajiyama et al. ............. 372/20 |
| 4,972,429 A | 11/1990 | Herbst ....................... 372/100 |
| 4,975,919 A | 12/1990 | Amada et al. ................. 372/33 |
| 4,977,573 A | 12/1990 | Bittenson et al. ............. 372/81 |
| 5,025,445 A | 6/1991 | Anderson et al. ............. 372/20 |
| 5,081,635 A | 1/1992 | Wakabayashi et al. ........ 372/57 |
| 5,090,020 A | 2/1992 | Bedwell ...................... 372/59 |
| 5,095,492 A | 3/1992 | Sandstrom ................. 372/102 |
| 5,142,543 A | 8/1992 | Wakabayashi et al. ........ 372/32 |
| 5,150,370 A | 9/1992 | Furuya et al. ............. 372/106 |
| 5,155,553 A * | 10/1992 | Chen .......................... 356/457 |
| 5,221,823 A | 6/1993 | Usui ..................... 219/121.78 |
| 5,226,050 A | 7/1993 | Burghardt .................... 372/20 |
| 5,325,378 A | 6/1994 | Zorabedian ................. 372/101 |
| 5,337,330 A | 8/1994 | Larson ......................... 372/86 |
| 5,377,215 A | 12/1994 | Das et al. ..................... 372/57 |
| 5,396,514 A | 3/1995 | Voss ............................ 372/57 |
| 5,404,366 A | 4/1995 | Wakabayashi et al. ........ 372/29 |
| 5,440,578 A | 8/1995 | Sandstrom ................... 372/59 |
| 5,450,207 A | 9/1995 | Fomenkov ................. 250/226 |
| 5,450,436 A | 9/1995 | Mizoguchi et al. ........... 372/59 |
| 5,535,233 A | 7/1996 | Mizoguchi et al. ........... 372/87 |
| 5,557,629 A | 9/1996 | Mizoguchi et al. ........... 372/87 |
| 5,559,584 A | 9/1996 | Miyaji et al. ................. 355/73 |
| 5,559,816 A | 9/1996 | Basting et al. ................ 372/27 |
| 5,572,543 A | 11/1996 | Heinemann et al. ........ 372/107 |
| 5,596,456 A | 1/1997 | Luecke ....................... 359/831 |
| 5,596,596 A | 1/1997 | Wakabayashi et al. ...... 372/102 |
| 5,642,374 A | 6/1997 | Wakabayashi et al. ........ 372/57 |
| 5,646,954 A | 7/1997 | Das et al. ..................... 372/55 |
| 5,657,334 A | 8/1997 | Das et al. ..................... 372/33 |
| 5,659,419 A | 8/1997 | Lokai et al. ................. 359/330 |
| 5,663,973 A | 9/1997 | Stamm et al. ................ 372/20 |
| 5,684,545 A | 11/1997 | Dou et al. ...................... 349/1 |
| 5,684,822 A | 11/1997 | Partlo .......................... 372/95 |
| 5,684,824 A | 11/1997 | Hayakawa ................. 372/101 |
| 5,729,562 A | 3/1998 | Birx et al. .................... 372/38 |
| 5,729,565 A | 3/1998 | Meller et al. ................. 372/87 |
| 5,748,316 A | 5/1998 | Wakabayashi et al. ...... 356/352 |
| 5,748,346 A | 5/1998 | David et al. .................. 359/15 |
| 5,761,236 A | 6/1998 | Kleinschmidt et al. ..... 372/100 |
| 5,763,855 A | 6/1998 | Shioji .................... 219/121.84 |
| 5,802,094 A | 9/1998 | Wakabayashi et al. ........ 372/57 |
| 5,811,753 A | 9/1998 | Weick |
| 5,818,865 A | 10/1998 | Watson et al. ................ 372/86 |
| 5,835,520 A | 11/1998 | Das et al. ..................... 372/57 |
| 5,852,627 A | 12/1998 | Ershov ....................... 372/108 |
| 5,856,991 A | 1/1999 | Ershov ......................... 372/57 |
| 5,875,207 A | 2/1999 | Osmanow ................... 372/86 |
| 5,898,725 A | 4/1999 | Fomenkov et al. ......... 372/102 |
| 5,901,163 A | 5/1999 | Ershov ......................... 372/20 |
| 5,914,974 A | 6/1999 | Partlo et al. .................. 372/38 |
| 5,917,849 A | 6/1999 | Ershov ....................... 372/102 |
| 5,936,988 A | 8/1999 | Partlo et al. .................. 372/38 |
| 5,940,421 A | 8/1999 | Partlo et al. .................. 372/38 |
| 5,946,337 A | 8/1999 | Govorkov et al. ............ 372/92 |
| 5,949,806 A | 9/1999 | Ness et al. .................... 372/38 |
| 5,949,974 A | 9/1999 | Ewing et al. .......... 395/200.32 |
| 5,970,082 A | 10/1999 | Ershov ....................... 372/102 |
| 5,978,391 A | 11/1999 | Das et al. ..................... 372/20 |
| 5,978,394 A | 11/1999 | Newman et al. ............. 372/32 |
| 5,978,406 A | 11/1999 | Rokni et al. .................. 372/58 |
| 5,978,409 A | 11/1999 | Das et al. ................... 372/100 |
| 5,982,795 A | 11/1999 | Rothweil et al. ............. 372/38 |
| 5,982,800 A | 11/1999 | Ishihara et al. ............... 372/57 |
| 5,991,324 A | 11/1999 | Knowles et al. .............. 372/57 |
| 5,999,318 A | 12/1999 | Morton et al. ............. 359/572 |
| 6,005,880 A | 12/1999 | Basting et al. ................ 372/38 |
| 6,014,206 A | 1/2000 | Basting et al. .............. 356/138 |
| 6,020,723 A | 2/2000 | Desor et al. ................ 320/166 |
| 6,021,153 A | 2/2000 | Okada ......................... 372/99 |
| 6,028,872 A | 2/2000 | Partlo et al. .................. 372/38 |
| 6,028,879 A | 2/2000 | Ershov ......................... 372/57 |
| 6,028,880 A | 2/2000 | Carlesi et al. ................ 372/58 |
| 6,061,382 A | 5/2000 | Govorkov et al. .......... 372/101 |
| 6,081,542 A | 6/2000 | Scaggs ........................ 372/70 |
| 6,094,448 A | 7/2000 | Fomenkov et al. ......... 372/102 |
| 6,151,346 A | 11/2000 | Partlo et al. .................. 372/38 |
| 6,154,470 A | 11/2000 | Basting et al. ................ 372/19 |
| 6,157,662 A | 12/2000 | Scaggs et al. ................ 372/60 |
| 6,160,831 A | 12/2000 | Kleinschmidt et al. ....... 372/57 |
| 6,160,832 A | 12/2000 | Kleinschmidt et al. ....... 372/57 |
| 6,163,559 A | 12/2000 | Watson ...................... 372/102 |
| 6,192,064 B1 | 2/2001 | Algots et al. ................. 372/99 |
| 6,198,761 B1 | 3/2001 | von Bergmann et al. ..... 372/86 |
| 6,212,214 B1 | 4/2001 | Vogler et al. ................. 372/59 |
| 6,212,217 B1 | 4/2001 | Erie et al. ................... 372/102 |
| 6,219,368 B1 | 4/2001 | Govorkov .................... 372/59 |
| 6,226,307 B1 | 5/2001 | Desor et al. .................. 372/37 |
| 6,243,405 B1 | 6/2001 | Borneis et al. ............... 372/57 |
| 6,243,406 B1 | 6/2001 | Heist et al. ................... 372/59 |
| 6,269,110 B1 | 7/2001 | Leinhos et al. ............... 372/57 |
| 6,272,158 B1 | 8/2001 | Kleinschmidt et al. ....... 372/32 |
| 6,285,701 B1 | 9/2001 | Albrecht et al. .............. 372/57 |
| 6,298,080 B1 | 10/2001 | Heist et al. ................... 372/99 |
| 6,330,261 B1 | 12/2001 | Ishihara et al. ............ 372/38.1 |
| 6,404,796 B1 | 6/2002 | Albrecht et al. .............. 372/57 |
| 6,498,803 B2 | 12/2002 | Heist et al. ................... 372/99 |
| 2002/0141471 A1 * | 10/2002 | Aab et al. ..................... 372/57 |

OTHER PUBLICATIONS

N. Tan–No, et al., "Dispersion–free Amplification and Oscillation in Phase–Conjugate Four–wave Mixing in an Atomic Vapor Doublet," *IEEE Journal of Quantum Electronics*, vol. QE–16, No. 2, Feb. 1980, pp. 147–153.

M.D. Levenson, et al., "Projection Photolithography by Wave–front Conjugation," *J. Opt. Soc. Am.*, vol. 71, No. 6, Jun. 1981, pp. 737–743.

Irving J. Bigio et al., "Injection–Locking Unstable Resonator Excimer Lasers," *IEEE J. of Quantum Electronics*, vol. QE–19, No. 9, Sep. 1983, pp. 1426–1436.

R.S. Taylor, "Preionization and Discharge Stability Study of Long Optical Pulse Duration UV–Preionized XeCl Lasers," *Applied Physiks B*, vol. B41., No. 1, Sep. 1986.

R.L. Sandstrom, "Measurements of Beam Characteristics Relevant to DUV Microlithography on KrF Excimer Laser," *Optical/Laser Microlithography III*, SPIE vol. 1264, 1990, pp. 505–519.

R.K. Tyson, Principles of Adaptive Optics, $2^{nd}$ edition, 1991, pp. 121–276.

Shintaro Kawata et al., "Spatial Coherence of KrF Excimer Lasers," *Applied Optics*, vol. 31, No. 3, Jan. 20, 1992, pp. 387–396.

Press Release entitled, "Lambda Physik Shows Readiness for the Future Challenges of Microlithography," Fort Lauderdale, FL., Dec. 1997.

Technology World Briefs, "Laser Could Extend Optical Lithography into VUV," *Photonics Spectra*, Jan. 1998.

* cited by examiner 1- window (5 deg window with AR coatings or Brewster window)
2- prisms (prism beam expander)
3- correction plate
4- grating
A,B- sealed chambers

US 6,801,561 B2

LASER SYSTEM AND METHOD FOR SPECTRAL NARROWING THROUGH WAVEFRONT CORRECTION

PRIORITY

This application claims the benefit of priority to U.S. provisional patent application No. 60/235,116, filed Sep. 25, 2000.

BACKGROUND

1. Field of the Invention

The invention relates to excimer and molecular fluorine laser systems, and particularly including a line-narrowing resonator configuration including fixed or adjustable wavefront curvature compensation.

2. Description of the Related Art

Line-narrowed excimer lasers are applied in the field of photolithography for production of integrated circuits. Achromatic imaging optics for this wavelength region are difficult to produce. For this reason line-narrowed excimer laser radiation is generated for use in photolithographic applications in order to prevent errors caused by chromatic aberrations. Exemplary bandwidths for different imaging systems are tabulated in Table 1 for the excimer laser wavelengths 248 nm (KrF laser), 193 nm (ArF laser), and for the molecular fluorine laser wavelength 157 nm ($F_2$-laser).

TABLE 1

| imaging optics | 248 nm | 193 nm | 157 nm |
|---|---|---|---|
| refractive optics: | 0.4–0.6 pm | 0.3–0.6 pm | 0.1 pm |
| catadioptics | 20–100 pm | 10–40 pm | approx. 1 pm |

Another important beam parameter is the "spectral purity" or the wavelength interval that contains, e.g., 95% of the energy of the laser radiation. Excimer lasers may include a planar diffraction grating within its resonator for providing dispersion as a wavelength selector for narrowing the bandwidth of the laser oscillation. To increase the resolution of the grating, a beam expander may be used to reduce the beam divergence. Even when a beam expander is used, the wavefront of the beam in front of or incident upon the grating is generally not planar. The radius of curvature of the wavefront may instead depend on the magnification of the beam expander in the region of, e.g., 400 m . . . 1200 m. The curved wavefront results in a broader spectral linewidth or bandwidth due to the fact that different portions of the curved wavefront strike the planar grating at different angles.

It is recognized in the present invention that it is desired to solve the above-described problem by providing an excimer or molecular fluorine laser resonator having wavefront compensation, and preferably including adjustable wavefront curvature correction, so that the incoming beam wavefront substantially matches the surface of the line-narrowing grating.

SUMMARY OF THE INVENTION

In view of the above, an excimer or molecular fluorine laser system is provided including a discharge chamber filled with a gas mixture at least including molecular fluorine and a buffer gas, multiple electrodes within the discharge chamber connected to a power supply circuit for energizing the gas mixture, a resonator for generating a laser beam, a line-narrowing unit within the resonator preferably including multiple optical components such as a beam expander and a grating, and a wavefront compensating optic for adjusting the curvature of the wavefront of the beam for compensating wavefront distortions and thereby enhancing the spectral purity of the beam.

The wavefront compensating optic is preferably and most advantageously disposed between the beam expander and the grating of the line-narrowing unit. In alternative embodiments, the wavefront compensating optic is otherwise positioned in the laser resonator such as between the discharge chamber and the line-narrowing unit, or the discharge chamber may be disposed between the line-narrowing unit and the wavefront compensating optic. In accordance with the preferred embodiment, the wavefront compensating optic may be sealably disposed between adjacent compartments of a multi-compartment enclosure, wherein each compartment includes at least one optic of the line-narrowing unit.

The wavefront compensating optic may be a plate, such as a null lens. One or both surfaces of the null lens may be adjustable and/or have an adjustable curvature for controlling the wavefront distortion compensation. The wavefront compensating optic may sealably enclose the gas mixture as a window of the discharge chamber.

A multi-compartment enclosure may be included having at least one optical component of the line-narrowing unit within each compartment. An atmosphere within at least one compartment may be preferably controlled for controlling the spectral purity of the beam by controlling an amount of wavefront distortion compensation. A wavefront compensating optic may be sealably disposed between adjacent compartments.

INCORPORATION BY REFERENCE

Figure 1:
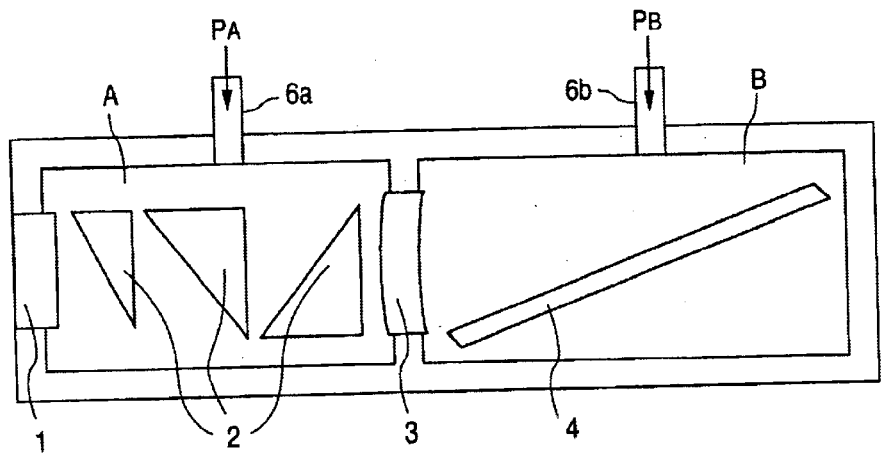
FIG. 1 schematically illustrates a line-narrowing module including a wavefront curvature compensating optic of an excimer or molecular fluorine laser according to a preferred embodiment.

What follows is a cite list of references which are, in addition to any references cited above in the background section or below in the detailed description of the preferred embodiments, and the background section itself, hereby incorporated by reference into the detailed description of the preferred embodiments below, as disclosing alternative embodiments of elements or features of the preferred embodiments not otherwise set forth in detail below. A single one or a combination of two or more of these references may be consulted to obtain a variation of the preferred embodiments described in the detailed description below. Further patent, patent application and non-patent references are cited in the written description and are also incorporated by reference into the preferred embodiment with the same effect as just described with respect to the following references:

U.S. Pat. Nos. 5,095,492, 6,061,382, 5,970,082, 6,154,470, 6,285,171, 6,219,368, 5,946,337 and 6,094,448;

U.S. patent application Ser. Nos. 09/317,695, 09/244,554, 09/454,803, 09/452,353, 09/594,892, 09/602,184, 09/598,552, 09/629,256, 09/694,246, 09/771,366, 09/738,849, 09/843,604, 09/712,367, 09/771,366, 09/738,849, 09/715,803, 60/280,398, 09/718,809, 09/584,420, 60/215,933, 09/923,770, 60/212,257, 60/244,744, 60/242,602, 60/267,567, 60/281,433, 60/296,947, 60/309,939 and 09/791,431, which are assigned to the same assignee as the present application; and German Patent publications DE 298 22 090, DE 298 22 082, and DE 42 25 781.

DETAILED DESCRIPTION OF THE PREFERRED EMBODIMENTS

A preferred gas discharge laser system, and particularly an excimer or molecular fluorine laser system, is described below including a discharge chamber having multiple electrodes therein and containing a gas mixture, a power supply circuit coupled to the electrodes for energizing the gas mixture, a resonator for generating a laser beam, one or more line-narrowing optics within the resonator, such as including a beam expander and a dispersive element such as a grating, and an intracavity wavefront compensating optic. The wavefront compensating optic may be a plate, such as a null lens, or another type of lens, and may be disposed between the beam expander and the grating, or before the beam expander or on the other side of the discharge chamber or as a window on the discharge chamber, for adjusting the curvature of the wavefront of the beam before striking the grating. The lens is preferably a null lens having surfaces of equal curvature and opposite sign.

The beam expander and the grating may be disposed within separate sealed chambers of the line-narrowing unit, although the beam expander and grating could be in a single sealed off chamber, and for the KrF laser, there may or may not be a sealed off chamber, whereas for the ArF or $F_2$ lasers, the line-narrowing unit will be preferably within a sealed off chamber which may or may not include multiple compartments each for housing one or more optics of the line-narrowing unit. The wavefront compensating optic may seals apart two chambers containing the beam expander and grating. The two chambers may be separately purged with an inert gas, or one or both may be substantially evacuated. The pressure in each chamber is preferably controlled for controlling the wavelength selected by the grating and/or the amount of wavefront compensation correction produced by the wavefront compensation plate.

The wavefront correction is preferably carried out by a correction plate positioned in the optical beam path way between the beam expander and the line narrowing element, and alternatively, is located before the beam expander within the line-narrowing module or between prisms of the beam expander, or outside of the line-narrowing module such as between the discharge chamber and the line-narrowing module, although advantages may be realized wherever the wavefront compensating optic is positioned in the resonator. For example, the wavefront compensating optic may also be used as an output coupler. The wavefront correction optic may be spherically-shaped, cylindrically-shaped, or otherwise. The wavefront correction optic preferably at least provides wavefront correction in a direction of dispersion of the dispersion element (e.g., grating), and/or in a direction of beam expansion, although correction may be provided also in a direction orthogonal to the dispersion direction. The optic may be a plate that is designed like a so-called null lens. The plate is preferably made by $CaF_2$, fused silica or other DUVNUV-transmissive material.

The null lens may be installed in such way that the convex surface shows in the direction of the grating or in the direction of the beam expander. The surfaces of the lens may be preferably antireflection (AR)-coated or uncoated, and the null lens may be preferably tilted (e.g., 5° for the preferred resonator setup, although the particular angle can vary depending on the resonator setup) relative to the optical axis of the resonator. The correction plate/null lens may have adjustable curvature, such as by varying a force on the outside of the optic in at least the direction of dispersion of the dispersion element, for adjusting its wavefront corrective characteristics or the wavefront compensation correction may performed by pressure variation in at least one sealed chamber of the narrow band unit. The line-narrowing unit may also include an etalon, particularly for the KrF and $F_2$ lasers, wherein the etalon may be within one of the preferred two sealed off chambers, as well, or on the other side of the discharge chamber or as a window on the discharge chamber. The sealed off chamber may be separated by a window with the correction plate or other optic within one of the chambers.

A preferred narrow band unit of an excimer or molecular fluorine laser is schematically depicted at FIG. 1. The narrow band unit shown in FIG. 1 includes two sealed off compartments: a first compartment A and a second compartment B. The beam is shown entering the first compartment A, through which the beam passes into the second compartment B, from a window 1 on the left side in FIG. 1. Particularly for the ArF and $F_2$ lasers, and also for the KrF laser, the beam path between the window 1 and the discharge chamber (not shown but would be to the left of the window 1 in FIG. 1) is protected within an enclosure (not shown, but see discussion with reference to FIG. 5, below) that is either purged with an inert gas or evacuated. The beam expander including prisms 2, and alternatively including lenses or reflective beam expanding optics, is shown installed in the compartment A. A grating 4, or other dispersive optic such as a dispersion prism, is shown positioned in compartment B in FIG. 1. A highly reflecting mirror may also be included in compartment B, either with compartment B also including the grating 4 such as in a Littman configuration, or without the grating 4, such as if a dispersive or interferometric line-narrowing optic is instead disposed in compartment A or on the other side of the discharge chamber or as a window on the discharge chamber, or between compartment A and the discharge chamber, etc.

The wavefront correction optic 3 is shown sealably disposed between compartments A and B. The optic 3 may be alternatively disposed at another location of the resonator, and instead an ordinary window may be sealably disposed between compartments A and B, i.e., wherein such window does not perform wavefront compensation. Another alternative is to have more than one wavefront compensation optic within the resonator. The optic 3, which may be a plate or a lens, changes the wavefront curvature of the incoming beam from its curvature as it is incident on the optic 3 from the left in FIG. 1 to a new curvature as it exits the optic 3, e.g., before it strikes the grating 4.

The wavefront correction optic 3 may be a plate, and may particularly be a null lens which has surfaces of substantially the same radius of curvature R, but with opposite sign (i.e., so that the surfaces of the null lens may be substantially parallel). This optic 3 is preferably made of fused silica or CaF$_2$ for the KrF laser, and is preferably CaF$_2$ for the F$_2$ laser and ArF laser, although such other VUV transmissive materials as BaF$_2$, LiF, SrF$_2$, or otherwise as understood by those skilled in the art may be used.

The compartments A and B are shown having inert gas inlets 6a and 6b, respectively. Each of compartments A and B may also have at least one outlet so that the inert gas may be flowed through the compartments A and/or B. Either or both of the inlets 6a and 6b may be used to evacuate compartments A and/or B, or one or both compartments may have an additional evacuation port for evacuating the compartment A and/or B, and such that an inert gas backfilling procedure may be used or to maintain one or both compartments A and/or B in a evacuated state. As shown in FIG. 1, compartments A and B are coupled with pressure tanks filled an inert gas, e.g., with nitrogen, helium, argon or another inert gas or gas that does not disturb the beam such as by substantial photoabsorption.

The pressures are indicated in FIG. 1 as P$_A$ and P$_B$, respectively, for compartments A and B. Each of these pressures P$_A$ and P$_B$ may be greater than, equal to or less than 1 bar. Inert gas can be added to either compartment A and/or B for increasing the pressure P$_A$ and/or P$_B$, respectively, and gases can be removed from either compartment A and/or B for decreasing the pressure P$_A$ and/or P$_B$, respectively. The pressures in the compartments are preferably independently adjustable and controlled. Pressure control may be performed as described in the Ser. No. 09/771,366 and 60/281,433 applications, incorporated by reference above.

Figure 2:
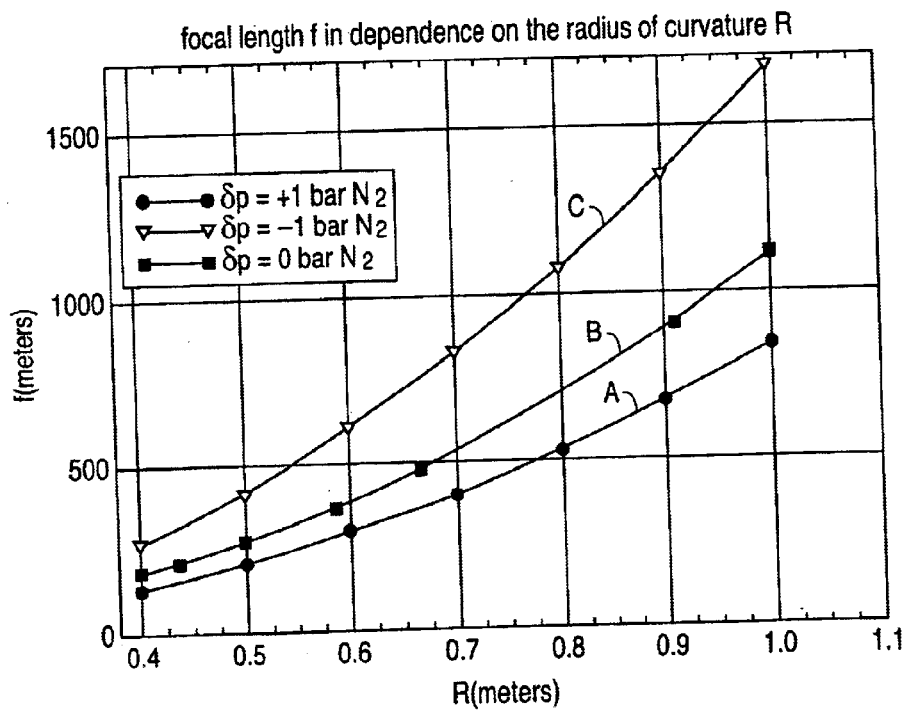
FIG. 2 is a graph including plots of focal lengths versus radii of curvature of the wavefront curvature compensation optic of FIG. 1.

FIG. 2 shows the focal length of the correction plate 3 of FIG. 1, according to the index of refraction within the two compartments A and B, versus the radius of curvature of the surfaces of the optic 3, which in this case is the preferred null lens. The focal length corresponds to the amount of wavefront compensation generated by the wavefront compensation optic. As illustrated at FIG. 2, the wavefront compensation amount, in turn, depends on the radius of curvature of the surfaces of the preferred null lens. If a null lens is not used and the wavefront compensation optic is instead a lens having non-parallel surfaces, the wavefront compensation will still depend on the focal length of the lens and the radius of curvature of one or both surfaces. Therefore in short, the amount of wavefront compensation can be adjusted or controlled by adjusting or controlling the radius of curvature of the surfaces of the null lens or other wavefront compensating optic. Such adjustment of the radius of curvature of the surfaces of the null lens may be performed in any way understood by those skilled in the art, while control of a force applied in the direction of wavefront compensation including in the direction of dispersion of the dispersive element of the line-narrowing unit or of beam expansion by the beam expander, as discussed in more detail below with reference to FIG. 4.

In generating the plots of FIG. 2, the null lens 3 had a thickness of 10 mm and was oriented with a convex surface in the direction of, or towards or facing, the grating 4. Three plots are shown for three pressure differences between the two compartments A and B: ΔP=P$_B$−P$_A$=+1.0 bar (plot A), 0 bar (plot B), and −1.0 bar (plot C). Each of Plots A–C of FIG. 2 show that the focal length (and wavefront compensation) increase with radius of curvature R of the surfaces of the null lens. FIG. 2 shows that the focal length at a same radius of curvature is greatest, among the three pressure conditions, when compartment A is at a 1 bar greater pressure than compartment B. The focal length is shown to be least when compartment B is at a 1 bar greater pressure than compartment A. The focal length increases from around 250 meters at R=0.4 meters to around 1700 meters at R=1.0 meters in plot C, from around 200 meters to around 1100 meters for plot B, and from around 175 meters to around 800 meters for plot A. Therefore, for a null lens whose radius of curvature is adjustable between 0.4 to 1.0 meters, and for the configuration shown in FIG. 1 wherein the pressure difference between compartments A and B can be varied between +1 bar and −1 bar, the focal length, and therefore the wavefront compensation, can be varied from around 175 to 1700 meters. Configurations can be arranged wherein only the radii of curvature is adjustable or the only the pressures are adjustable, or such that either is or both are adjustable within different radii and/or pressure ranges.

The focal length is shown as increasing faster with radius of curvature when compartment A is at a 1 bar greater pressure than compartment B than when they are at the same pressure, and even faster than when compartment B is at a 1 bar greater pressure than compartment A. Also, for each pressure condition shown in FIG. 2, the focal length increases faster as the radius of curvature becomes greater.

Wavefront correction by variation of the radius of curvature can be achieved by bending the wavefront compensation optic. As noted, the wavefront correction can, alternatively or in addition to varying the radius of curvature, be varied by changing of the inert gas pressure difference between compartments A and B. It has to be noted that pressure changes result in a slight change of the curvature of the plate, although this was not taken into consideration in generating plots A–C of FIG. 2. Variation of the pressure in chamber B also results in a change of the laser wavelength. The wavelength can then be re-tuned by the tuning element (e.g., tilt of the second beam expansion prism (see U.S. patent application Ser. Nos. 09/771,366 and 09/244,544, which are assignd to the same assignee as the present application and are hereby incorporated by reference), or if the wavelength is tuned by rotation of the grating or a mirror in a Littman configuration, or whatever method is used for tuning the wavelength among those understood by persons skilled in the art. Wavefront correction by pressure variation has, in comparison to known methods, the advantage that no optical element in the resonator has to be tilted or bent to adjust the wavefront, although tilting and/or bending of the wavefront compensation optic may be performed in some embodiments herein.

Figure 3A:
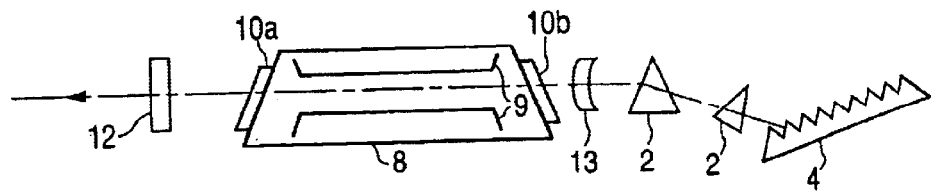
FIGS. 3a–3b schematically illustrate resonator arrangements according to alternative embodiments.
Figure 3B:
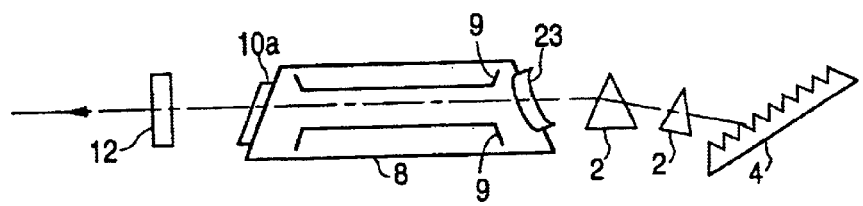

Although the preferred embodiments set forth above with reference to FIGS. 1–2 are understood as being most advantageous, particularly with respect to the positioning of a wavefront compensating optic between a beam expander and a dispersive optic, such as a grating, of a line-narrowing module of an excimer or molecular fluorine laser system, FIGS. 3A and 3B schematically illustrate alternative configurations of excimer or molecular fluorine laser resonators including line-narrowing units and wavefront compensation optics, and relate to alternative positions of the wavefront compensating optic relative to other components of the laser resonator. FIG. 3A shows a resonator including a discharge chamber 8 including main electrodes 9 and windows 10a and 10b, output coupler 12, beam expansion prisms 2 and grating 4 (see discussion below with reference to FIG. 5 for more details of preferred and alternative embodiments regarding the discharge chamber 8, and the resonator including line-narrowing unit and beam outcoupling, as well as the overall laser system, in general).

The resonator shown in FIG. 3A also includes a wavefront compensating optic 13, such as a plate such as a null lens, or a lens having non-parallel surfaces. The wavefront compensation optic 13 is shown disposed between the discharge chamber 8 and the line-narrowing unit, which in the embodiment shown in FIG. 3A includes the beam expander prisms 2 and the grating 4. The wavefront compensation optic 13 may be disposed between the two prisms 2 shown, or between after the prisms 2 and before the grating, or if more than two prisms 2 are included in the resonator, between any two adjacent prisms 2 or before or after all of the prisms 2. The optic 13 may alternatively be disposed between the discharge chamber 8 and the output coupler 12. In other possible alternative embodiments, surfaces of the prisms 2, windows 10 or 10b, the grating 4 or the output coupler 12 may be curved to provide the wavefront compensation, the curvatures in all cases may be adjustable.

FIG. 3B shows a resonator including a discharge chamber 8 including main electrodes 9 and window 10a, output coupler 12, beam expansion prisms 2 and grating 4. The resonator shown in FIG. 3B is similar to that shown in FIG. 3A, except window 10b of FIG. 3A is replaced by wavefront compensating optic 23, such as a plate such as a null lens, or a lens having non-parallel surfaces, in FIG. 3B. The wavefront compensation optic 13 is shown sealably disposed as a window on the discharge chamber 8 on the line-narrowing unit side. The optic 23 may be a window on the other side of the discharge chamber 8.

Figure 4:
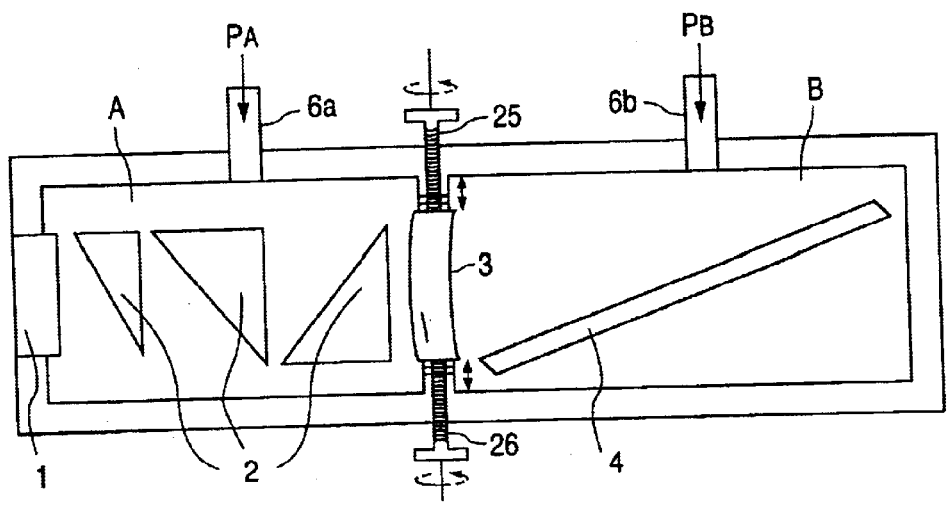
FIG. 4 schematically illustrates an arrangement wherein the curvature of the wavefront compensating optic is configured to be adjustable.

FIG. 4 schematically illustrates a way to adjust the curvature of the wavefront compensation plate 3 introduced above with reference to FIG. 1. The curvature adjustment technique illustrated at FIG. 4 may also be used with any embodiment herein such as those illustrated at FIGS. 3A and 3B. A bolt-driven adjustment mechanism is shown including bolt mechanisms 25 and 26. When one or both of the bolt mechanisms 25 or 26 is turned, the force on the optic 3 is changed and the radius of curvature, focal length and amount of wavefront compensation is changed. More than two and only one bolt mechanism may be included. The turning of the bolt mechanisms is preferably automatic according to signals from a laser system processor (see below with reference to FIG. 5), and may alternatively be manual. A separate control mechanism may be provided for the direction orthogonal to that shown in FIG. 4 (normal to the page) and orthogonal to the dispersion by the dispersion element 4 and beam expansion by the beam expander prisms 2. Other adjustment mechanisms that may be used such as a piezo may be described in the Ser. No. 09/452,353 and No. 60/267,567 applications, and in the U.S. Pat. Nos. 6,061,382 and 6,094,448 patent, each incorporated by reference above.

Overall Laser System

Figure 5:
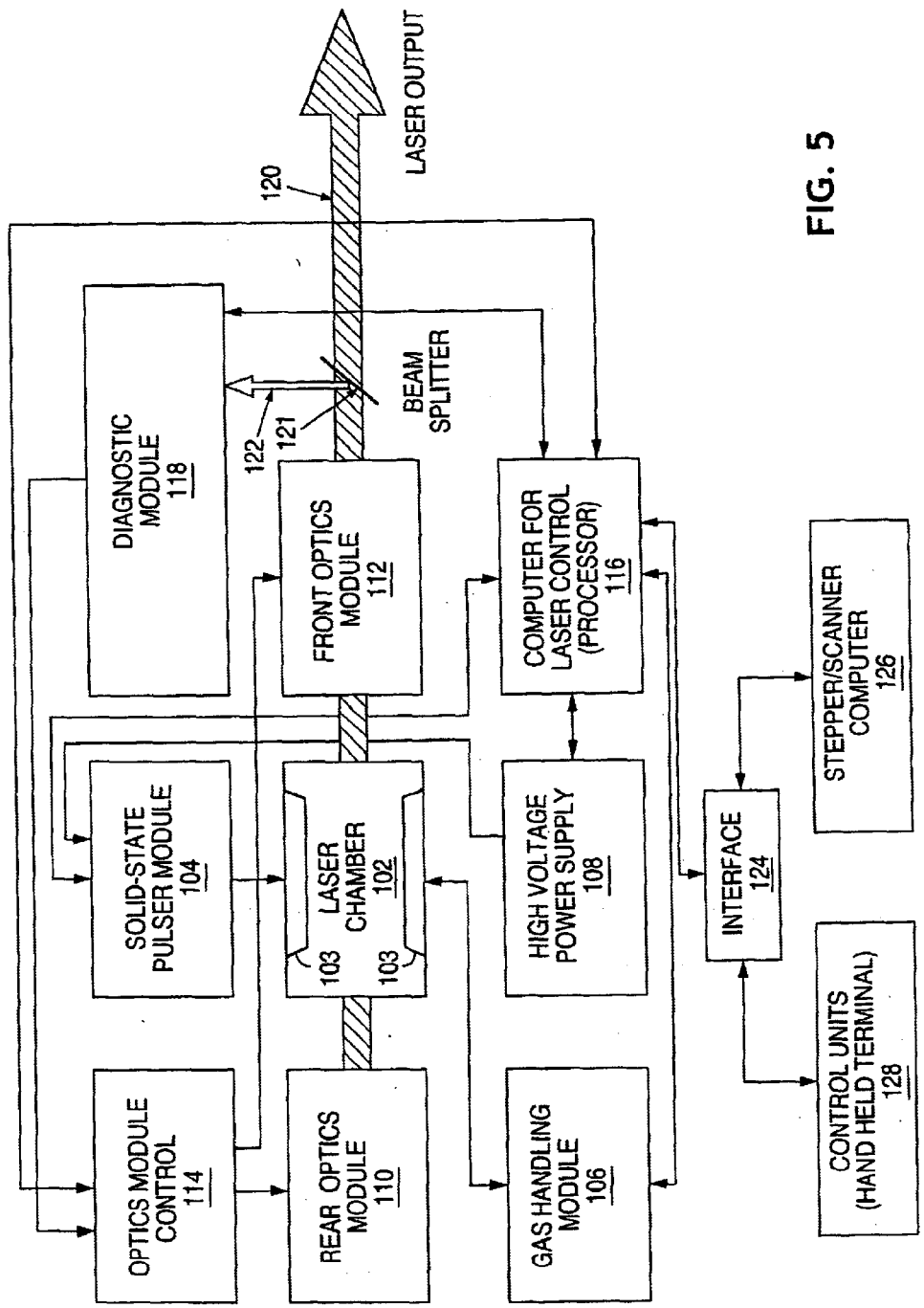
FIG. 5 schematically illustrates an excimer or molecular fluorine laser system according to a preferred embodiment.

FIG. 5 schematically illustrates an overall excimer or molecular fluorine laser system according to a preferred embodiment which preferably includes the advantageous features described above with reference to FIGS. 1–4. Referring to FIG. 5, a preferred excimer or molecular fluorine laser system is a DUV or VUV laser system, such as a KrF, ArF or molecular fluorine ($F_2$) laser system, for use with a deep ultraviolet (DUV) or vacuum ultraviolet (VUV) lithography system. Alternative configurations for laser systems for use in such other industrial applications as TFT annealing, photoablation and/or micromachining, e.g., include configurations understood by those skilled in the art as being similar to and/or modified from the system shown in FIG. 3 to meet the requirements of that application. For this purpose, alternative DUV or VUV laser system and component configurations are described at U.S. patent application Ser. Nos. 09/317,695, 09/244,554, 09/452,353, 09/512,417, 09/599,130, 09/694,246, 09/712,877, 09/574, 921, 09/738,849, 09/718,809, 09/629,256, 09/712,367, 09/771,366, 09/715,803, 09/738,849, 09/791,431, 60/204,095, 09/741,465, 09/574,921, 09/734,459, 09/741,465, 09/686,483, 09/584,420, 09/843,604, 09/780,120, 09/792,622, 09/791,431, 09/811,354, 09/838,715, 09/715,803, 09/717,757, 09/771,013, 09/791,430, 09/712,367 and 09/780,124, and U.S. Pat. Nos. 6,285,701, 6,005,880, 6,061,382, 6,020,723, 6,219,368, 6,212,214, 6,154,470, 6,157,662, 6,243,405, 6,243,406, 6,198,761, 5,946,337, 6,014,206, 6,157,662, 6,154,470, 6,160,831, 6,160,832, 5,559,816, 4,611,270, 5,761,236, 6,212,214, 6,243,405, 6,154,470, and 6,157,662, each of which is assigned to the same assignee as the present application and is hereby incorporated by reference.

Discharge Tube

The system shown in FIG. 5 generally includes a laser chamber 102 (or laser tube including a heat exchanger and fan for circulating a gas mixture within the chamber 102 or tube) having a pair of main discharge electrodes 103 connected with a solid-state pulser module 104, and a gas handling module 106. The gas handling module 106 has a valve connection to the laser chamber 102 so that halogen, any active rare gases and a buffer gas or buffer gases, and optionally a gas additive, may be injected or filled into the laser chamber, preferably in premixed forms (see U.S. patent application Ser. Nos. 09/513,025, 09/780,120, 09/734,459 and 09/447,882, which are assigned to the same assignee as the present application, and U.S. Pat. Nos. 4,977,573, 4,393,505 and 6,157,662, which are each hereby incorporated by reference. The solid-state pulser module 104 is powered by a high voltage power supply 108. A thyratron pulser module may alternatively be used. The laser chamber 102 is surrounded by optics module 110 and optics module 112, forming a resonator. The optics modules 110 and 112 may be controlled by an optics control module 114, or may be alternatively directly controlled by a computer or processor 116, particular when line-narrowing optics are included in one or both of the optics modules 110,112, such as is preferred when KrF, ArF or $F_2$ lasers are used for optical lithography.

Processor Control

The processor 116 for laser control receives various inputs and controls various operating parameters of the system. A diagnostic module 118 receives and measures one or more parameters, such as pulse energy, average energy and/or power, and preferably wavelength, of a split off portion of the main beam 120 via optics for deflecting a small portion 122 of the beam toward the module 118, such as preferably a beam splitter module 121. The beam 120 is preferably the laser output to an imaging system (not shown) and ultimately to a workpiece (also not shown) such as particularly for lithographic applications, and may be output directly to an application process. The laser control computer 116 may communicate through an interface 124 with a stepper/scanner computer, other control units 126, 128 and/or other external systems.

The processor or control computer 116 receives and processes values of some of the pulse shape, energy, ASE, energy stability, energy overshoot for burst mode operation, wavelength, spectral purity and/or bandwidth, among other input or output parameters of the laser system and output beam. The processor may receive signals corresponding to the wavefront compensation such as values of the bandwidth, and may control the wavefront compensation performed by the wavefront compensation optic 3, 13, 23 (see above) in a feedback loop by sending signals to adjust the pressure(s) and/or curvature(s) of surfaces associated with the wavefront compensation optic 3, 13, 23. The processor 116 also controls the line narrowing module to tune the wavelength and/or bandwidth or spectral purity, and controls the power supply and pulser module 104 and 108 to control preferably the moving average pulse power or energy, such that the energy dose at points on the workpiece is stabilized around a desired value. In addition, the computer 116 controls the gas handling module 106 which includes gas supply valves connected to various gas sources. Further functions of the processor 116 such as to provide overshoot control, energy stability control and/or to monitor input energy to the discharge, are described in more detail at U.S. patent application Ser. No. 09/588,561, which is assigned to the same assignee and is hereby incorporated by reference.

As shown in FIG. 5, the processor 116 preferably communicates with the solid-state or thyratron pulser module 104 and HV power supply 108, separately or in combination, the gas handling module 106, the optics modules 110 and/or 112, the diagnostic module 118, and an interface 124. The laser resonator which surrounds the laser chamber 102 containing the laser gas mixture includes optics module 110 including line-narrowing optics for a line narrowed excimer or molecular fluorine laser, which may be replaced by a high reflectivity mirror or the like in a laser system wherein either line-narrowing is not desired, or if line narrowing is performed at the front optics module 112, or a spectral filter external to the resonator is used for narrowing the linewidth of the output beam.

Solid State Pulser Module

The laser chamber 102 contains a laser gas mixture and includes one or more preionization units (not shown) in addition to the pair of main discharge electrodes 103. Preferred main electrodes 103 are described at U.S. patent application Ser. No. 09/453,670 for photolithographic applications, which is assigned to the same assignee as the present application and is hereby incorporated by reference, and may be alternatively configured, e.g., when a narrow discharge width is not preferred. Other electrode configurations are set forth at U.S. Pat. Nos. 5,729,565 and 4,860,300, each of which is assigned to the same assignee, and alternative embodiments are set forth at U.S. Pat. Nos. 4,691,322, 5,535,233 and 5,557,629, all of which are hereby incorporated by reference. Preferred preionization units may be sliding surface or corona-type and are described U.S. patent application Ser. No. 09/922,241 and 09/532,276 (sliding surface) and Ser. Nos. 09/692,265 and 09/247,887 (corona discharge), each of which is assigned to the same assignee as the present application, and additional alternative embodiments are set forth at U.S. Pat. Nos. 5,337,330, 5,818,865, 5,875,207 and 5,991,324, and German Gebraushmuster DE 295 21 572 U1, all of the above patents and patent applications being hereby incorporated by reference.

The solid-state or thyratron pulser module 104 and high voltage power supply 108 supply electrical energy in compressed electrical pulses to the preionization and main electrodes 103 within the laser chamber 102 to energize the gas mixture. Components of the preferred pulser module and high voltage power supply are described above, and further details may be described at U.S. patent application Ser. Nos. 09/640,595, 09/838,715, 60/204,095, 09/432,348 and 09/390,146, and U.S. Pat. Nos. 6,005,880, 6,226,307 and 6,020,723, each of which is assigned to the same assignee as the present application and which is hereby incorporated by reference into the present application. Other alternative pulser modules are described at U.S. Pat. Nos. 5,982,800, 5,982,795, 5,940,421, 5,914,974, 5,949,806, 5,936,988, 6,028,872, 6,151,346 and 5,729,562, each of which is hereby incorporated by reference.

Resonator, General

The laser resonator which surrounds the laser chamber 102 containing the laser gas mixture includes optics module 110 preferably including line-narrowing optics for a line narrowed excimer or molecular fluorine laser such as for photolithography, which may be replaced by a high reflectivity mirror or the like in a laser system wherein either line-narrowing is not desired (for TFT annealling, e.g.), or if line narrowing is performed at the front optics module 112, or a spectral filter external to the resonator is used, or if the line-narrowing optics are disposed in front of the HR mirror, for narrowing the bandwidth of the output beam. For an $F_2$-laser, optics for selecting one of multiple lines around 157 nm may be used, e.g., one or more dispersive prisms, birefringent plates or blocks and/or an interferometric device such as an etalon or a device having a pair of opposed, non-parallel plates such as described in the Ser. No. 09/715,803 and No. 60/280,398 applications, wherein the same optic or optics or an additional line-narrowing optic or optics for narrowing the selected line may be used. Also, particularly for the $F_2$-laser, and also possibly for other excimer lasers, the total gas mixture pressure may be lower than conventional systems, e.g., lower than 3 bar, for producing the selected line at a narrow bandwidth such as 0.5 pm or less without using additional line-narrowing optics (see U.S. patent application no. 60/212,301, which is assigned to the same assignee as the present application and is hereby incorporated by reference).

The laser chamber 102 is sealed by windows transparent to the wavelengths of the emitted laser radiation 120. The windows may be Brewster windows or may be aligned at another angle, e.g., 5°, to the optical path of the resonating beam. One of the windows may also serve to output couple the beam or as a highly reflective resonator reflector on the opposite side of the chamber 102 as the beam is outcoupled.

Diagnostic Module

After a portion of the output beam 120 passes the outcoupler of the optics module 112, that output portion preferably impinges upon a beam splitter module 121 which includes optics for deflecting a portion 122 of the beam to the diagnostic module 118, or otherwise allowing a small portion 122 of the outcoupled beam to reach the diagnostic module 118, while a main beam portion 120 is allowed to continue as the output beam 120 of the laser system (see U.S. patent application Ser. Nos. 09/771,013, 09/598,552, and 09/712,877 which are assigned to the same assignee as the present invention, and U.S. Pat. No. 4,611,270, each of which is hereby incorporated by reference. Preferred optics include a beamsplitter or otherwise partially reflecting surface optic. The optics may also include a mirror or beam splitter as a second reflecting optic. More than one beam splitter and/or HR mirror(s), and/or dichroic mirror(s) may be used to direct portions of the beam to components of the diagnostic module 118. A holographic beam sampler, transmission grating, partially transmissive reflection diffraction grating, grism, prism or other refractive, dispersive and/or transmissive optic or optics may also be used to separate a small beam portion from the main beam 120 for detection at the diagnostic module 118, while allowing most of the main beam 120 to reach an application process directly or via an imaging system or otherwise. These optics or additional optics may be used to filter out visible radiation such as the red emission from atomic fluorine in the gas mixture from the split off beam prior to detection.

The output beam 120 may be transmitted at the beam splitter module while a reflected beam portion is directed at the diagnostic module 118, or the main beam 120 may be reflected, while a small portion is transmitted to the diagnostic module 118. The portion of the outcoupled beam which continues past the beam splitter module 121 is the output beam 120 of the laser, which propagates toward an industrial or experimental application such as an imaging system and workpiece for photolithographic applications.

The diagnostic module 118 preferably includes at least one energy detector. This detector measures the total energy of the beam portion that corresponds directly to the energy of the output beam 120 (see U.S. Pat. Nos. 4,611,270 and 6,212,214 which are hereby incorporated by reference). An optical configuration such as an optical attenuator, e.g., a plate or a coating, or other optics may be formed on or near the detector or beam splitter module 121 to control the intensity, spectral distribution and/or other parameters of the radiation impinging upon the detector (see U.S. patent application Ser. Nos. 09/172,805, 09/741,465, 09/712,877, 09/771,013 and 09/771,366, each of which is assigned to the same assignee as the present application and is hereby incorporated by reference).

One other component of the diagnostic module 118 is preferably a wavelength and/or bandwidth detection component such as a monitor etalon or grating spectrometer, and a hollow cathode lamp or reference light source for providing absolute wavelength calibration of the monitor etalon or grating spectrometer (see U.S. patent application Ser. Nos. 09/416,344, 09/686,483, and 09/791,431, each of which is assigned to the same assignee as the present application, and U.S. Pat. Nos. 4,905,243, 5,978,391, 5,450,207, 4,926,428, 5,748,346, 5,025,445, 6,160,832, 6,160,831, 6,269,110, 6,272,158 and 5,978,394, all of the above wavelength and/or bandwidth detection and monitoring components being hereby incorporated by reference). The bandwidth and/or wavelength or other spectral, energy or other beam parameter may be monitored and controlled in a feedback loop including the processor 116 and optics control modules 110, 112, gas handling module 106, power supply and pulser modules 103, 104, or other laser system component modules. For example, the total pressure of the gas mixture in the laser tube 102 may be controlled to a particular value for producing an output beam at a particular bandwidth and/or energy.

Other components of the diagnostic module may include a pulse shape detector or ASE detector, such as are described at U.S. Pat. Nos. 6,243,405 and 6,243,406 and U.S. patent application Ser. No. 09/842,281, which is assigned to the same assignee as the present application, each of which are hereby incorporated by reference, such as for gas control and/or output beam energy stabilization, or to monitor the amount of amplified spontaneous emission (ASE) within the beam to ensure that the ASE remains below a predetermined level. There may be a beam alignment monitor, e.g., such as is described at U.S. Pat. No. 6,014,206, or beam profile monitor, e.g., U.S. patent application Ser. No. 09/780,124, which is assigned to the same assignee, wherein each of these patent documents is hereby incorporated by reference.

Beam Path Enclosure

Particularly for the molecular fluorine laser system, and also for the ArF and KrF laser systems, an enclosure (not shown) preferably seals the beam path of the beam 120 such as to keep the beam path free of photoabsorbing or other contaminant species that can tend to attenuate and/or otherwise disturb the beam such as by providing a varying refractive index along the optical path of the beam. Smaller enclosures preferably seal the beam path between the chamber 102 and the optics modules 110 and 112 and between the beam splitter 122 and the diagnostic module 118 (see the Ser. Nos. 09/317,695, 09/594,892 and 09/598,552 applications, incorporated by reference above). The optics modules 110 and 112 are maintained in an atmosphere that is sufficiently evacuated or have an inert gas purged atmosphere. Preferred enclosures are described in detail in U.S. patent application Ser. Nos. 09/598,552, 09/594,892, 09/727,600, 09/317,695 and 09/131,580, which are assigned to the same assignee and are hereby incorporated by reference, and U.S. Pat. Nos. 6,219,368, 5,559,584, 5,221,823, 5,763,855, 5,811,753 and 4,616,908, all of which are hereby incorporated by reference.

Gas Mixture

The laser gas mixture is initially filled into the laser chamber 102 in a process referred to herein as a "new fills". In such procedure, the laser tube is evacuated of laser gases and contaminants, and re-filled with an ideal gas composition of fresh gas. The gas composition for a very stable excimer or molecular fluorine laser in accord with the preferred embodiment uses helium or neon or a mixture of helium and neon as buffer gas(es), depending on the particular laser being used. Preferred gas compositions are described at U.S. Pat. Nos. 4,393,405, 6,157,162, 6,243,406 and 4,977,573 and U.S. patent application Ser. Nos. 09/513,025, 09/447,882, 09/789,120 and 09/588,561, each of which is assigned to the same assignee and is hereby incorporated by reference into the present application. The concentration of the fluorine in the gas mixture may range from 0.003% to 1.00%, and is preferably around 0.1%. An additional gas additive, such as a rare gas or otherwise, may be added for increased energy stability, overshoot control and/or as an attenuator as described in the 09/513,025 application incorporated by reference above. Specifically, for the $F_2$-laser, an addition of xenon, krypton and/or argon may be used. The concentration of xenon or argon in the mixture may range from 0.0001% to 0.1%. For an ArF-laser, an addition of xenon or krypton may be used also having a concentration between 0.0001% to 0.1%. For the KrF laser, an addition of xenon or argon may be used also having a concentration between 0.0001% to 0.1%. Gas replenishment actions are described below for gas mixture compositions of systems such as ArF, KrF, and XeCl excimer lasers and molecular fluorine lasers, wherein the ideas set forth herein may be advantageously incorporated into any of these systems, and other gas discharge laser systems.

Gas Replenishment

Halogen gas injections, including micro-halogen injections of, e.g., 1–3 milliliters of halogen gas, mixed with, e.g., 20–60 milliliters of buffer gas or a mixture of the halogen gas, the buffer gas and a active rare gas for rare gas-halide excimer lasers, per injection for a total gas volume in the laser tube 102 of, e.g., 100 liters, total pressure adjustments and gas replacement procedures may be performed using the gas handling module 106 preferably including a vacuum pump, a valve network and one or more gas compartments. The gas handling module 106 receives gas via gas lines connected to gas containers, tanks, canisters and/or bottles.

Some preferred and alternative gas handling and/or replenishment procedures, other than as specifically described herein (see below), are described at U.S. Pat. Nos. 4,977,573, 6,212,214, 6,243,406 and 5,396,514 and U.S. patent application Ser. Nos. 09/447,882, 09/734,459, 09/513,025 and 09/588,561, each of which is assigned to the same assignee as the present application, and U.S. Pat. Nos. 5,978,406, 6,014,398 and 6,028,880, all of which are hereby incorporated by reference. A xenon gas or other gas additive supply may be included either internal or external to the laser system according to the '025 application, mentioned above.

Total pressure adjustments in the form of releases of gases or reduction of the total pressure within the laser tube 102 may also be performed. Total pressure adjustments may be followed by gas composition adjustments if it is determined that, e.g., other than the desired partial pressure of halogen gas is within the laser tube 102 after the total pressure adjustment. Total pressure adjustments may also be performed after gas replenishment actions, and may be performed in combination with smaller adjustments of the driving voltage to the discharge than would be made if no pressure adjustments were performed in combination.

Gas replacement procedures may be performed and may be referred to as partial, mini- or macro-gas replacement operations, or partial new fill operations, depending on the amount of gas replaced, e.g., anywhere from a few milliliters up to 50 liters or more, but less than a new fill, such as are set forth in the Ser. No. 09/734,459 application, incorporated by reference above. As an example, the gas handling unit 106 connected to the laser tube 102 either directly or through an additional valve assembly, such as may include a small compartment for regulating the amount of gas injected (see the '459 application), may include a gas line for injecting a premix A including 1%$F_2$:99%Ne or other buffer gas such as He, and another gas line for injecting a premix B including 1% rare gas:99% buffer gas, for a rare gas-halide excimer laser, wherein for a $F_2$ laser premix B is not used. Another line may be used for injecting a gas additive or gas additive premix, or a gas additive may be added to premix A, premix B or a buffer gas. Another line may be used for total pressure additions or reductions, i.e., for flowing buffer gas into the laser tube or allowing some of the gas mixture in the tube to be released, possibly accompanying halogen injections for maintaining the halogen concentration. Thus, by injecting premix A (and premix B for rare gas-halide excimer lasers) into the tube 102 via the valve assembly, the fluorine concentration in the laser tube 102 may be replenished. Then, a certain amount of gas may be released corresponding to the amount that was injected to maintain the total pressure at a selected level. Additional gas lines and/or valves may be used for injecting additional gas mixtures. New fills, partial and mini gas replacements and gas injection procedures, e.g., enhanced and ordinary micro-halogen injections, such as between 1 milliliter or less and 3–10 milliliters, or more depending on the degree of stability desired, and any and all other gas replenishment actions are initiated and controlled by the processor 116 which controls valve assemblies of the gas handling unit 106 and the laser tube 102 based on various input information in a feedback loop. These gas replenishment procedures may be used in combination with gas circulation loops and/or window replacement procedures to achieve a laser system having an increased servicing interval for both the gas mixture and the laser tube windows.

Line Narrowing

A general description of the line-narrowing features of embodiments of the laser system particularly for use with photolithographic applications is provided here, followed by a listing of patent and patent applications being incorporated by reference as describing variations and features that may be used within the scope of the preferred embodiments herein for providing an output beam with a high spectral purity or bandwidth (e.g., below 1 pm and preferably 0.6 pm or less). These exemplary embodiments may be used along with the wavefront compensating optic 3, 13, 13 described above. For the $F_2$ laser, the optics may be used for selecting the primary line $X_1$ only of multiple lines around 157 nm, or may be used to provide additional line narrowing as well as performing line-selection, or the resonator may include optics for line-selection and additional optics for line-narrowing of the selected line, and line-narrowing may be provided by controlling (i.e., reducing) the total pressure (see U.S. patent application No. 60/212,301, which is assigned to the same assignee and is hereby incorporated by reference). Line-narrowing of the broadband emission of the ArF and/or KrF lasers may be as set forth below.

Exemplary line-narrowing optics contained in the optics module 110 include a beam expander, an optional interferometric device such as an etalon or a device having a pair of opposed non-planar reflection plates such as may be described in the Ser. No. 09/715,803 or 60/280,398 applications, which are assigned to the same assignee as the present application and are hereby incorporated by reference, and a diffraction grating, and alternatively one or more dispersion prisms may be used, wherein the grating would produce a relatively higher degree of dispersion than the prisms although generally exhibiting somewhat lower efficiency than the dispersion prism or prisms, for a narrow band laser such as is used with a refractive or catadioptric optical lithography imaging system. As mentioned above, the front optics module may include line-narrowing optics such as may be described in any of the Ser. Nos. 09/715,803, 09/738,849, and 09/718,809 applications, each being assigned to the same assignee and hereby incorporated by reference.

Instead of having a retro-reflective grating in the rear optics module 110, the grating may be replaced with a highly reflective mirror, and a lower degree of dispersion may be produced by a dispersive prism, or a beam expander and an interferometric device such as an etalon or device having non-planar opposed plates may be used for line-selection and narrowing, or alternatively no line-narrowing or line-selection may be performed in the rear optics module 110. In the case of using an all-reflective imaging system, the laser may be configured for semi-narrow band operation such as having an output beam linewidth in excess of 0.5 pm, depending on the characteristic broadband bandwidth of the laser, such that additional line-narrowing of the selected line would not be used, either provided by optics or by reducing the total pressure in the laser tube.

The beam expander of the above exemplary line-narrowing optics of the optics module 110 preferably includes one or more prisms. The beam expander may include other beam expanding optics such as a lens assembly or a converging/diverging lens pair. The grating or a highly reflective mirror is preferably rotatable so that the wavelengths reflected into the acceptance angle of the resonator can be selected or tuned. Alternatively, the grating, or other optic or optics, or the entire line-narrowing module may be pressure tuned, such as is set forth in the Ser. No. 09/771,366 application and the U.S. Pat. No. 6,154,470 patent, each of which is assigned to the same assignee and is hereby incorporated by reference. The grating may be used both for dispersing the beam for achieving narrow bandwidths and also preferably for retroreflecting the beam back toward the laser tube. Alternatively, a highly reflective mirror is positioned after the grating which receives a reflection from the grating and reflects the beam back toward the grating in a Littman configuration, or the grating may be a transmission grating. One or more dispersive prisms may also be used, and more than one etalon or other interferometric device may be used.

Depending on the type and extent of line-narrowing and/or selection and tuning that is desired, and the particular laser that the line-narrowing optics are to be installed into, there are many alternative optical configurations that may be used. For this purpose, those shown in U.S. Pat. Nos. 4,399,540, 4,905,243, 5,226,050, 5,559,816, 5,659,419, 5,663,973, 5,761,236, 6,081,542, 6,061,382, 6,154,470, 5,946,337, 5,095,492, 5,684,822, 5,835,520, 5,852,627, 5,856,991, 5,898,725, 5,901,163, 5,917,849, 5,970,082, 5,404,366, 4,975,919, 5,142,543, 5,596,596, 5,802,094, 4,856,018, 5,970,082, 5,978,409, 5,999,318, 5,150,370 and 4,829,536, and German patent DE 298 22 090.3, and any of the patent applications mentioned above and below herein, may be consulted to obtain a line-narrowing configuration that may be used with a preferred laser system herein, and each of these patent references is each hereby incorporated by reference into the present application.

Additional Laser System Features

Optics module 112 preferably includes means for outcoupling the beam 120, such as a partially reflective resonator reflector. The beam 120 may be otherwise outcoupled such as by an intra-resonator beam splitter or partially reflecting surface of another optical element, and the optics module 112 would in this case include a highly reflective mirror. The optics control module 114 preferably controls the optics modules 110 and 112 such as by receiving and interpreting signals from the processor 116, and initiating realignment, gas pressure adjustments in the modules 110,112, or reconfiguration procedures (see the '353, '695, '277, '554, and '527 applications mentioned above).

The halogen concentration in the gas mixture is maintained constant during laser operation by gas replenishment actions by replenishing the amount of halogen in the laser tube for the preferred excimer or molecular fluorine laser herein, such that these gases are maintained in a same predetermined ratio as are in the laser tube 102 following a new fill procedure. In addition, gas injection actions such as $\mu$HIs as understood from the '882 application, mentioned above, may be advantageously modified into micro gas replacement procedures, such that the increase in energy of the output laser beam may be compensated by reducing the total pressure. In addition, the laser system is preferably configured for controlling the input driving voltage so that the energy of the output beam is at the predetermined desired energy. The driving voltage is preferably maintained within a small range around $HV_{opt}$, while the gas procedure operates to replenish the gases and maintain the average pulse energy or energy dose, such as by controlling an output rate of change of the gas mixture or a rate of gas flow through the laser tube 102. Advantageously, the gas procedures set forth herein permit the laser system to operate within a very small range around $HV_{opt}$, while still achieving average pulse energy control and gas replenishment, and increasing the gas mixture lifetime or time between new fills (see U.S. patent application Ser. No. 09/780,120, which is assigned to the same assignee as the present application and is hereby incorporated by reference).

In all of the above and below embodiments, the material used for any dispersive prisms, the prisms of any beam expanders, etalons or other interferometric devices, laser windows and the outcoupler is preferably one that is highly transparent at excimer or molecular fluorine laser wavelengths such as 248 nm for the KrF laser, 193 nm for the ArF laser and 157 nm for the $F_2$ laser. The materials are also capable of withstanding long-term exposure to ultraviolet light with minimal degradation effects. Examples of such materials are $CaF_2$, $MgF_2$, BaF2, LiF and $SrF_2$, and in some cases fluorine-doped quartz may be used, and for the KrF laser, fused silica may be used. Also, in all of the embodiments, many optical surfaces, particularly those of the prisms, may or may not have an anti-reflective coating on one or more optical surfaces, in order to minimize reflection losses and prolong their lifetime.

Also, the gas composition for the excimer or molecular fluorine laser in the above configurations uses either helium, neon, or a mixture of helium and neon as a buffer gas. For rare gas-halide excimer lasers, the rare gas is preferably maintained at a concentration of around 1.0% in the gas mixture. The concentration of fluorine in the gas mixture preferably ranges from 0.003% to around 1.0%, and is preferably around 0.1%. However, if the total pressure is reduced for narrowing the bandwidth, then the fluorine concentration may be higher than 0.1%, such as may be maintained between 1 and 7 mbar, and more preferably around 3–5 mbar, notwithstanding the total pressure in the tube or the percentage concentration of the halogen in the gas mixture. The addition of a trace amount of xenon, and/or argon, and/or oxygen, and/or krypton and/or other gases (see the '025 application) may be used for increasing the energy stability, burst control, and/or output energy of the laser beam. The concentration of xenon, argon, oxygen, or krypton in the mixture as a gas additive may range from 0.0001% to 0.1%, and would be preferably significantly below 0.1%. Some alternative gas configurations including trace gas additives are set forth at U.S. patent application Ser. No. 09/513,025 and U.S. Pat. No. 6,157,662, each of which is assigned to the same assignee and is hereby incorporated by reference.

A line-narrowed oscillator, e.g., a set forth above, may be followed by a power amplifier for increasing the power of the beam output by the oscillator. Preferred features of the oscillator-amplifier set-up are set forth at U.S. patent application Ser. No. 09/599,130 and No. 60/228,184, which are assigned to the same assignee and are hereby incorporated by reference. The amplifier may be the same or a separate discharge chamber 102. An optical or electrical delay may be used to time the electrical discharge at the amplifier with the reaching of the optical pulse from the oscillator at the amplifier. With particular respect to the $F_2$-laser, a molecular fluorine laser oscillator may have an advantageous output coupler having a transmission interference maximum at $\lambda_1$ and a minimum at $\lambda_2$. A 157 nm beam is output from the output coupler and is incident at the amplifier of this embodiment to increase the power of the beam. Thus, a very narrow bandwidth beam is achieved with high suppression of the secondary line $\lambda_2$ and high power (at least several Wafts to more than 10 Watts).

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow, and equivalents thereof.

What is claimed is:

1. An excimer or molecular fluorine laser system, comprising:
   a discharge chamber filled with a gas mixture at least including molecular fluorine and a buffer gas;
   a plurality of electrodes within the discharge chamber connected to a power supply circuit for energizing the gas mixture;
   a resonator for generating a laser beam;
   a line-narrowing unit within the resonator including a beam expander and a grating;
   an adjustable wavefront compensating lens disposed between the beam expander and the grating for adjusting the curvature of the wavefront of the beam; and
   an enclosure including a plurality of sealed-off compartments, wherein each compartment includes therein at least one optical component of the line-narrowing unit, the adjustable wavefront compensating lens being sealably disposed between adjacent compartments whereby the shape of the adjustable wavefront compensating lens can be adjusted by controlling a pressure of at least one adjacent sealed-off compartment.

2. The laser system of claim 1, wherein the adjustable wavefront compensating lens is a null lens.

3. The laser system of claim 2, wherein the null lens includes adjustable surfaces of approximately equal and opposite radii of curvature.

4. The laser system of claim 2, wherein a curvature of at least one surface of the null lens is adjustable for controlling the wavefront distortion compensation.

5. The laser system of claim 1, wherein the beam expander and the grating are located in separate compartments of the enclosure.

6. The system of claim 5, wherein the adjustable wavefront compensating lens seals apart the compartments containing the beam expander and grating.

7. The system of claim 1, wherein each compartment is purged with an inert gas.

8. The laser system of claim 1, wherein at least one compartment is purged with an inert gas and at least one other compartment is substantially evacuated.

9. The laser system of claim 1, wherein the pressure in at least two compartments is adjustable.

10. An excimer or molecular fluorine laser system, comprising:
    a discharge chamber filled with a gas mixture at least including molecular fluorine and a buffer gas;
    a plurality of electrodes within the discharge chamber connected to a power supply circuit for energizing the gas mixture;
    a resonator for generating a laser beam;
    an enclosure including first and second compartments, the first and second compartments each containing at least one element of a line-narrowing unit; and
    an adjustable wavefront compensating plate sealably disposed between the first and second compartments, the shape of at least one surface of the adjustable wavefront compensating plate being determined by an amount of pressure in at least one of said first and second compartments.

11. The laser system of claim 10, wherein the adjustable plate is a null lens.

12. The laser system of claim 11, wherein the null lens includes surfaces of approximately equal and opposite radii of curvature.

13. The laser system of claim 10, wherein the line-narrowing unit includes a beam expander and a grating located in separate compartments of the enclosure.

14. The system of claim 10, wherein each compartment is purged with an inert gas.

15. The laser system of claim 10, wherein at least one compartment is purged with an inert gas and at least one other compartment is substantially evacuated.

16. The laser system of claim 10, wherein the pressure in at least two compartments is adjustable.

17. An excimer or molecular fluorine laser system, comprising:
    a discharge chamber filled with a gas mixture at least including molecular fluorine and a buffer gas;
    a plurality of electrodes within the discharge chamber connected to a power supply circuit for energizing the gas mixture;
    a resonator for generating a laser beam;
    an enclosure including first and second compartments, the first and second compartments each containing at least one element of a line-narrowing unit; and
    a wavefront compensating lens sealably disposed between the first and second compartments, the shape of at least one surface of the adjustable wavefront compensating plate being determined by an amount of pressure in at least one of said first and second compartments.

18. A gas discharge laser system, comprising:
    a discharge chamber filled with a gas mixture at least including molecular fluorine and a buffer gas;
    a plurality of electrodes within the discharge chamber connected to a power supply circuit for energizing the gas mixture;
    a resonator for generating a laser beam;
    a line-narrowing unit within the resonator including a plurality of optical components;
    an enclosure including a pair of sealed-off compartments, wherein each compartment includes therein at least one optical component of the line-narrowing unit, and an atmosphere within each compartment is controlled; and
    a wavefront compensating lens between the pair of sealed off compartments in the enclosure, the atmosphere within each compartment determining the curvature of at least one surface of the wavefront compensating lens in order to compensate for wavefront distortions.

19. The laser system of claim 18, wherein the pressure within at least one of the compartments is adjustable such that a value of said spectral parameter is adjustable.

20. The laser system of claim 18, wherein the pressure in each of the compartments is adjustable.

21. The laser system of claim 18, wherein the atmosphere within each compartment determines the curvature of two opposing surfaces of the wavefront compensating lens in order to compensate for wavefront distortions.

22. The laser system of claim 18, wherein the wavefront compensating lens is a null lens.

23. The laser system of claim 22, wherein the null lens includes surfaces of approximately equal and opposite radii of curvature.

24. A gas discharge laser system, comprising:
    a discharge chamber filled with a gas mixture at least including molecular fluorine and a buffer gas;
    a plurality of electrodes within the discharge chamber connected to a power supply circuit for energizing the gas mixture;
    a resonator for generating a laser beam;

a line-narrowing unit within the resonator including a plurality of optical components;

an enclosure including a plurality of sealed-off compartments, wherein each compartment includes therein at least one optical component of the line-narrowing unit; and an adjustable wavefront compensating lens positioned between two of the sealed-off compartments in order to compensate for wavefront distortions.

25. The laser system of claim 24, wherein the pressure within at least one of the compartments is controlled such that a value of a spectral parameter is controlled.

26. The laser system of claim 25, wherein the pressure in at least two compartments is controlled.

27. The laser system of claim 24, wherein the two compartments are sealably separated by the adjustable wavefront compensating lens.

28. The laser system of claim 27, wherein the lens is a null lens.

29. The laser system of claim 28, wherein the null lens includes surfaces of approximately equal and opposite radii of curvature.

30. The laser system of claim 28, wherein a curvature of at least one surface of the null lens is adjustable for controlling the wavefront distortion compensation.

* * * * *